US010645028B2

(12) United States Patent
Vohra et al.

(10) Patent No.: US 10,645,028 B2
(45) Date of Patent: *May 5, 2020

(54) METHODS AND APPARATUS FOR AUTOMATICALLY PROVISIONING RESOURCES WITHIN A DISTRIBUTED CONTROL PLANE OF A SWITCH

(71) Applicant: Juniper Networks, Inc., Sunnyvale, CA (US)

(72) Inventors: Quaizar Vohra, Santa Clara, CA (US); Ravi Shekhar, Sunnyvale, CA (US); Umesh Kondur, Union City, CA (US); Arijit Sarcar, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/997,194

(22) Filed: Jan. 15, 2016

(65) Prior Publication Data

US 2016/0134565 A1    May 12, 2016

Related U.S. Application Data

(63) Continuation of application No. 12/969,057, filed on Dec. 15, 2010, now Pat. No. 9,240,923.

(Continued)

(51) Int. Cl.
*H04L 12/947* (2013.01)
*H04L 12/24* (2006.01)
(Continued)

(52) U.S. Cl.
CPC .......... *H04L 49/25* (2013.01); *H04L 41/0806* (2013.01); *H04L 41/12* (2013.01);
(Continued)

(58) Field of Classification Search
CPC ....... H04L 41/00; H04L 41/04; H04L 41/042; H04L 41/08; H04L 41/12
See application file for complete search history.

(56) References Cited

U.S. PATENT DOCUMENTS 4,942,574 A  7/1990  Zelle
5,138,615 A  8/1992  Lamport et al.
(Continued)

FOREIGN PATENT DOCUMENTS

CN    101132286 A    2/2008
EP    1 318 628 A1    6/2003
(Continued)

OTHER PUBLICATIONS

F.K. Liotopoulos et al., "A Modular, 160 Gbps ATM Switch Architecture for Multimedia Networking Support, based on a 3-Stage Clos Network" Proceedings of the International Teletraffic Congress. ITC-16. Teletraffic Engineering in a Competitive World. Edinburgh, UK, Jun. 7, 1999, Amsterdam: Elsevier, NL, vol. 3A, XP000877657 ISBN: 978-0-444-50268-1, pp. 529-538.

(Continued)

*Primary Examiner* — Luat Phung
(74) *Attorney, Agent, or Firm* — Cooley LLP

(57) ABSTRACT

In some embodiments, a network management module is operatively coupled to a set of edge devices that are coupled to a set of peripheral processing devices. The network management module can receive a signal associated with a broadcast protocol from an edge device from the set of edge devices in response to that edge device being operatively coupled to a switch fabric. The network management module can provision that edge device in response to receiving the signal. The network management module can define multiple network control entities at the set of edge devices such that each network control entity from the multiple network control entities can provide forwarding-state infor- (Continued)

mation associated with at least one peripheral processing device from the set of peripheral processing devices to at least one remaining network control entity from the multiple network control entities using a selective protocol.

13 Claims, 6 Drawing Sheets

Related U.S. Application Data

(60) Provisional application No. 61/316,720, filed on Mar. 23, 2010.

(51) Int. Cl.
  *H04L 12/931* (2013.01)
  *H04L 29/12* (2006.01)

(52) U.S. Cl.
  CPC .............. *H04L 49/70* (2013.01); *H04L 61/20* (2013.01); *H04L 29/12207* (2013.01)

(56) References Cited

U.S. PATENT DOCUMENTS

| | | | |
|---|---|---|---|
| 5,367,520 A | 11/1994 | Cordell | |
| 5,801,641 A | 9/1998 | Yang et al. | |
| 5,825,772 A * | 10/1998 | Dobbins | H04L 12/1886 |
| | | | 370/396 |
| 5,913,921 A | 6/1999 | Tosey et al. | |
| 5,926,473 A | 7/1999 | Gridley | |
| 5,987,028 A | 11/1999 | Yang et al. | |
| 5,991,295 A | 11/1999 | Tout et al. | |
| 5,991,297 A | 11/1999 | Palnati | |
| 6,049,542 A | 4/2000 | Prasad | |
| 6,049,546 A | 4/2000 | Ramakrishnan | |
| 6,075,773 A | 6/2000 | Clark et al. | |
| 6,212,183 B1 | 4/2001 | Wilford | |
| 6,246,692 B1 | 6/2001 | Dai et al. | |
| 6,335,930 B1 | 1/2002 | Lee | |
| 6,385,198 B1 | 5/2002 | Ofek et al. | |
| 6,393,026 B1 | 5/2002 | Irwin | |
| 6,473,428 B1 | 10/2002 | Nichols et al. | |
| 6,553,028 B1 | 4/2003 | Tang et al. | |
| 6,587,470 B1 | 7/2003 | Elliot et al. | |
| 6,597,689 B1 | 7/2003 | Chiu et al. | |
| 6,606,325 B1 * | 8/2003 | Cain | H04L 45/02 |
| | | | 370/408 |
| 6,609,153 B1 | 8/2003 | Salkewicz | |
| 6,639,910 B1 | 10/2003 | Provencher et al. | |
| 6,654,373 B1 | 11/2003 | Maher, III et al. | |
| 6,658,481 B1 | 12/2003 | Basso et al. | |
| 6,665,495 B1 | 12/2003 | Miles et al. | |
| 6,751,238 B1 | 6/2004 | Lipp et al. | |
| 6,760,339 B1 | 7/2004 | Noel et al. | |
| 6,816,486 B1 | 11/2004 | Rogers | |
| 6,823,454 B1 | 11/2004 | Hind et al. | |
| 6,829,237 B2 | 12/2004 | Carson et al. | |
| 6,850,704 B1 | 2/2005 | Dave | |
| 6,856,620 B1 | 2/2005 | Dunsmore et al. | |
| 6,865,673 B1 | 3/2005 | Nessett et al. | |
| 6,868,082 B1 | 3/2005 | Allen, Jr. et al. | |
| 6,876,652 B1 | 4/2005 | Bell et al. | |
| 6,934,260 B1 | 8/2005 | Kanuri | |
| 6,978,459 B1 | 12/2005 | Dennis et al. | |
| 6,990,097 B2 | 1/2006 | Norman et al. | |
| 7,024,592 B1 | 4/2006 | Voas et al. | |
| 7,046,661 B2 | 5/2006 | Oki et al. | |
| 7,082,134 B1 | 7/2006 | Lim et al. | |
| 7,088,710 B1 | 8/2006 | Johnson et al. | |
| 7,173,931 B2 | 2/2007 | Chao et al. | |
| 7,177,919 B1 | 2/2007 | Truong et al. | |
| 7,178,052 B2 | 2/2007 | Hebber et al. | |
| 7,180,862 B2 | 2/2007 | Peebles et al. | |
| 7,230,947 B1 | 6/2007 | Huber et al. | |
| 7,233,568 B2 | 6/2007 | Goodman et al. | |
| 7,245,629 B1 | 7/2007 | Yip et al. | |
| 7,248,760 B1 | 7/2007 | Corbalis et al. | |
| 7,277,429 B2 | 10/2007 | Norman et al. | |
| 7,289,513 B1 | 10/2007 | Medved et al. | |
| 7,295,566 B1 | 11/2007 | Chiu et al. | |
| 7,315,897 B1 | 1/2008 | Hardee et al. | |
| 7,330,467 B2 | 2/2008 | Sharma | |
| 7,369,561 B2 | 5/2008 | Wybenga et al. | |
| 7,391,730 B1 * | 6/2008 | Chandra | H04L 45/021 |
| | | | 370/236 |
| 7,406,038 B1 | 7/2008 | Oelke et al. | |
| 7,408,927 B2 | 8/2008 | George | |
| 7,415,034 B2 | 8/2008 | Muller et al. | |
| 7,415,627 B1 | 8/2008 | Radhakrishnan et al. | |
| 7,420,933 B2 | 9/2008 | Booth et al. | |
| 7,428,219 B2 | 9/2008 | Khosravi | |
| 7,430,171 B2 | 9/2008 | Black et al. | |
| 7,437,469 B2 | 10/2008 | Ellanti et al. | |
| 7,466,703 B1 * | 12/2008 | Arunachalam | H04L 45/00 |
| | | | 370/351 |
| 7,471,676 B2 | 12/2008 | Wybenga et al. | |
| 7,489,625 B2 | 2/2009 | Varma | |
| 7,496,252 B1 | 2/2009 | Corbalis et al. | |
| 7,505,458 B2 | 3/2009 | Menon et al. | |
| 7,519,054 B2 | 4/2009 | Varma | |
| 7,564,869 B2 | 7/2009 | Cafiero et al. | |
| 7,586,909 B1 | 9/2009 | Walrand et al. | |
| 7,590,102 B2 | 9/2009 | Varma | |
| 7,596,614 B2 | 9/2009 | Saunderson et al. | |
| 7,606,262 B1 | 10/2009 | Beshai et al. | |
| 7,630,373 B2 | 12/2009 | Okuno | |
| 7,664,123 B2 | 2/2010 | Ashwood Smith et al. | |
| 7,675,912 B1 | 3/2010 | Ward et al. | |
| 7,688,816 B2 | 3/2010 | Park et al. | |
| 7,702,765 B1 | 4/2010 | Raszuk | |
| 7,715,382 B2 | 5/2010 | Lakshman et al. | |
| 7,720,064 B1 | 5/2010 | Rohde | |
| 7,733,856 B2 | 6/2010 | Hongal et al. | |
| 7,746,799 B2 | 6/2010 | Kokot et al. | |
| 7,751,416 B2 | 7/2010 | Smith et al. | |
| 7,792,993 B1 | 9/2010 | Hopprich et al. | |
| 7,830,905 B2 | 11/2010 | Scott et al. | |
| 7,860,097 B1 | 12/2010 | Lovett et al. | |
| 7,873,693 B1 | 1/2011 | Mehrotra et al. | |
| 7,877,483 B1 | 1/2011 | Finn | |
| 7,899,930 B1 | 3/2011 | Turner et al. | |
| 7,961,734 B2 | 6/2011 | Panwar et al. | |
| 8,054,832 B1 | 11/2011 | Shukla | |
| 8,059,680 B2 | 11/2011 | Minami et al. | |
| 8,089,904 B2 | 1/2012 | Balasubramaniam et al. | |
| 8,175,079 B2 | 5/2012 | Alapuranen et al. | |
| 2002/0009078 A1 | 1/2002 | Wilson et al. | |
| 2002/0019958 A1 | 2/2002 | Cantwell et al. | |
| 2002/0051450 A1 | 5/2002 | Ganesh et al. | |
| 2002/0061020 A1 | 5/2002 | Chao et al. | |
| 2002/0064170 A1 | 5/2002 | Siu et al. | |
| 2002/0118692 A1 | 8/2002 | Oberman et al. | |
| 2002/0141397 A1 | 10/2002 | Piekarski et al. | |
| 2002/0145974 A1 | 10/2002 | Saidi et al. | |
| 2002/0159449 A1 | 10/2002 | Carson et al. | |
| 2002/0168012 A1 | 11/2002 | Ramaswamy | |
| 2003/0026287 A1 | 2/2003 | Mullendore et al. | |
| 2003/0039212 A1 | 2/2003 | Lloyd et al. | |
| 2003/0081540 A1 | 5/2003 | Jones et al. | |
| 2003/0084219 A1 | 5/2003 | Yao et al. | |
| 2003/0200330 A1 | 10/2003 | Oelke et al. | |
| 2003/0200473 A1 | 10/2003 | Fung | |
| 2003/0217122 A1 | 11/2003 | Roese et al. | |
| 2003/0223420 A1 | 12/2003 | Ferolito | |
| 2004/0023558 A1 | 2/2004 | Fowler et al. | |
| 2004/0030766 A1 | 2/2004 | Witkowski | |
| 2004/0034702 A1 | 2/2004 | He | |
| 2004/0034864 A1 | 2/2004 | Barrett et al. | |
| 2004/0039820 A1 | 2/2004 | Colby et al. | |
| 2004/0039986 A1 | 2/2004 | Solomon et al. | |
| 2004/0054866 A1 | 3/2004 | Blumenau et al. | |
| 2004/0062202 A1 | 4/2004 | Storr | |
| 2004/0064559 A1 | 4/2004 | Kupst et al. | |

(56) References Cited

U.S. PATENT DOCUMENTS

| | | |
|---|---|---|
| 2004/0076151 A1 | 4/2004 | Fant et al. |
| 2004/0117438 A1 | 6/2004 | Considine et al. |
| 2004/0165598 A1 | 8/2004 | Shrimali et al. |
| 2004/0254909 A1 | 12/2004 | Testa |
| 2005/0002334 A1 | 1/2005 | Chao et al. |
| 2005/0025141 A1 | 2/2005 | Chao et al. |
| 2005/0055428 A1 | 3/2005 | Terai et al. |
| 2005/0102549 A1 | 5/2005 | Davies et al. |
| 2005/0129017 A1 | 6/2005 | Guingo et al. |
| 2005/0138346 A1 | 6/2005 | Cauthron |
| 2005/0175017 A1 | 8/2005 | Christensen et al. |
| 2005/0180438 A1 | 8/2005 | Ko et al. |
| 2005/0193114 A1 | 9/2005 | Colby et al. |
| 2005/0232258 A1 | 10/2005 | Wybenga et al. |
| 2005/0267959 A1 | 12/2005 | Monga et al. |
| 2006/0005185 A1 | 1/2006 | Nguyen |
| 2006/0018379 A1 | 1/2006 | Cooper |
| 2006/0029072 A1 | 2/2006 | Perera et al. |
| 2006/0092975 A1 | 5/2006 | Ansari et al. |
| 2006/0164199 A1 | 7/2006 | Gilde et al. |
| 2006/0165070 A1 | 7/2006 | Hall et al. |
| 2006/0165085 A1 | 7/2006 | Konda |
| 2006/0165098 A1 | 7/2006 | Varma |
| 2006/0165111 A1 | 7/2006 | Varma |
| 2006/0165112 A1 | 7/2006 | Varma |
| 2006/0187856 A1* | 8/2006 | Booth, III ........... H04L 12/4641 370/254 |
| 2006/0198321 A1 | 9/2006 | Nadeau et al. |
| 2006/0269187 A1 | 11/2006 | Lin et al. |
| 2007/0002883 A1 | 1/2007 | Edsall et al. |
| 2007/0006056 A1 | 1/2007 | Lehner et al. |
| 2007/0036178 A1 | 2/2007 | Hares et al. |
| 2007/0073882 A1 | 3/2007 | Brown et al. |
| 2007/0106807 A1 | 5/2007 | Hegde et al. |
| 2007/0115918 A1 | 5/2007 | Bodin et al. |
| 2007/0118595 A1* | 5/2007 | Jain ................... H04L 29/12009 709/203 |
| 2007/0121499 A1 | 5/2007 | Pal et al. |
| 2007/0136489 A1 | 6/2007 | Temoshenko et al. |
| 2007/0153462 A1 | 7/2007 | Crippen et al. |
| 2007/0189283 A1 | 8/2007 | Agarwal et al. |
| 2007/0280253 A1 | 12/2007 | Rooholamini et al. |
| 2007/0283045 A1 | 12/2007 | Nguyen et al. |
| 2007/0291535 A1 | 12/2007 | Eberle et al. |
| 2008/0031151 A1 | 2/2008 | Williams |
| 2008/0044181 A1 | 2/2008 | Sindhu |
| 2008/0065749 A1 | 3/2008 | Kucukyavuz et al. |
| 2008/0075071 A1 | 3/2008 | Beshai |
| 2008/0080548 A1 | 4/2008 | Mullendore et al. |
| 2008/0086768 A1 | 4/2008 | Mirza-Baig |
| 2008/0089323 A1 | 4/2008 | Elias et al. |
| 2008/0112133 A1 | 5/2008 | Torudbakken et al. |
| 2008/0126788 A1 | 5/2008 | Kreek et al. |
| 2008/0130517 A1 | 6/2008 | Lee et al. |
| 2008/0151863 A1 | 6/2008 | Lawrence et al. |
| 2008/0159277 A1 | 7/2008 | Vobbilisetty et al. |
| 2008/0163207 A1 | 7/2008 | Reumann et al. |
| 2008/0165704 A1 | 7/2008 | Marchetti et al. |
| 2008/0175239 A1 | 7/2008 | Sistanizadeh et al. |
| 2008/0186875 A1 | 8/2008 | Kitani |
| 2008/0192648 A1 | 8/2008 | Galles |
| 2008/0212472 A1 | 9/2008 | Musacchio et al. |
| 2008/0214059 A1 | 9/2008 | Rothermel et al. |
| 2008/0219184 A1 | 9/2008 | Fowler et al. |
| 2008/0259555 A1 | 10/2008 | Bechtolsheim et al. |
| 2008/0259784 A1* | 10/2008 | Allan .................. H04L 45/02 370/216 |
| 2008/0275975 A1 | 11/2008 | Pandey et al. |
| 2008/0285449 A1 | 11/2008 | Larsson et al. |
| 2008/0315985 A1 | 12/2008 | Johnsen et al. |
| 2008/0317025 A1 | 12/2008 | Manula et al. |
| 2008/0320117 A1 | 12/2008 | Johnsen et al. |
| 2009/0037585 A1 | 2/2009 | Miloushev et al. |
| 2009/0049191 A1 | 2/2009 | Tolliver |
| 2009/0052345 A1 | 2/2009 | Brown et al. |
| 2009/0070775 A1 | 3/2009 | Riley |
| 2009/0074414 A1 | 3/2009 | Miles et al. |
| 2009/0109963 A1 | 4/2009 | Tanizawa et al. |
| 2009/0129775 A1 | 5/2009 | Handelman |
| 2009/0161692 A1 | 6/2009 | Hirata et al. |
| 2009/0213779 A1 | 8/2009 | Zhang et al. |
| 2009/0214208 A1 | 8/2009 | Beshai |
| 2009/0219830 A1 | 9/2009 | Venner et al. |
| 2009/0271851 A1 | 10/2009 | Hoppe et al. |
| 2009/0300608 A1 | 12/2009 | Ferris et al. |
| 2009/0304010 A1 | 12/2009 | Kurebayashi et al. |
| 2009/0328024 A1 | 12/2009 | Li et al. |
| 2010/0002382 A1 | 1/2010 | Aybay et al. |
| 2010/0002714 A1 | 1/2010 | George et al. |
| 2010/0017497 A1 | 1/2010 | Brown et al. |
| 2010/0020806 A1 | 1/2010 | Vahdat et al. |
| 2010/0061240 A1 | 3/2010 | Sindhu et al. |
| 2010/0061241 A1 | 3/2010 | Sindhu et al. |
| 2010/0061367 A1 | 3/2010 | Sindhu et al. |
| 2010/0061389 A1 | 3/2010 | Sindhu et al. |
| 2010/0061391 A1* | 3/2010 | Sindhu ............... H04L 49/1515 370/412 |
| 2010/0061394 A1 | 3/2010 | Sindhu et al. |
| 2010/0091779 A1 | 4/2010 | Juhl et al. |
| 2010/0097926 A1 | 4/2010 | Huang et al. |
| 2010/0165876 A1 | 7/2010 | Shukla et al. |
| 2010/0165877 A1 | 7/2010 | Shukla et al. |
| 2010/0169467 A1* | 7/2010 | Shukla ................ H04L 49/70 709/220 |
| 2010/0182933 A1 | 7/2010 | Hu et al. |
| 2010/0189121 A1 | 7/2010 | Beshai |
| 2010/0192202 A1 | 7/2010 | Ker |
| 2010/0214949 A1 | 8/2010 | Smith et al. |
| 2010/0265832 A1 | 10/2010 | Bajpay et al. |
| 2010/0306408 A1 | 12/2010 | Greenberg et al. |
| 2011/0052191 A1 | 3/2011 | Beshai |
| 2011/0069706 A1 | 3/2011 | Sen et al. |
| 2011/0161468 A1 | 6/2011 | Tuckey et al. |
| 2012/0033665 A1 | 2/2012 | Da Silva et al. |
| 2012/0069842 A1 | 3/2012 | Reddy et al. |
| 2012/0093154 A1* | 4/2012 | Rosenberg ........... H04L 45/04 370/392 |
| 2012/0128004 A1 | 5/2012 | Aybay et al. |
| 2012/0155320 A1 | 6/2012 | Vohra et al. |
| 2012/0155453 A1 | 6/2012 | Vohra |
| 2012/0158942 A1 | 6/2012 | Kalusivalingam et al. |
| 2012/0189009 A1 | 7/2012 | Shekhar et al. |
| 2013/0003726 A1 | 1/2013 | Sindhu et al. |

FOREIGN PATENT DOCUMENTS

| | | |
|---|---|---|
| EP | 1 758 320 A1 | 2/2007 |
| EP | 1 892 905 A1 | 2/2008 |
| EP | 1 924 030 A1 | 5/2008 |
| EP | 2 164 209 A1 | 3/2010 |
| EP | 2 413 550 A1 | 7/2011 |
| EP | 2 369 782 A1 | 9/2011 |
| EP | 2 456 138 A1 | 5/2012 |
| EP | 2 466 825 A1 | 6/2012 |
| EP | 2 466 826 A1 | 6/2012 |
| GB | 2 362 289 A | 11/2001 |
| WO | WO 00/08801 | 2/2000 |
| WO | WO 2008/144927 A1 | 12/2008 |

OTHER PUBLICATIONS

K. Kompella et al., "Virtual Private LAN Service (VPLS) Using BGP for Auto-Discovery and Signaling" [online], Retrieved from the Internet: <URL: http://www.ietf.org/rfc/rfc4761.txt>, Jan. 2007, 27 pages.

Cisco Systems, Inc., "Intermediate System-to-Intermediate System (IS-IS) TLVs" Document ID: 5739 [online], Retrieved from the Internet: <URL: http://www.cisco.com/en/US/tech/tk365/technologies_tech_note09186a0080094bbd.shtml>, Aug. 10, 2005, 8 pages.

H. Jonathan Chao et al. "Matching Algorithms for Three-Stage Bufferless Clos Network Switches" IEEE Communications Magazine, Oct. 2003, pp. 46-54.

(56) References Cited

OTHER PUBLICATIONS

Jonathan S. Turner et al. "Multirate Clos Networks" IEEE Communications Magazine, Oct. 2003, pp. 1-11.
Office Action for Chinese Patent Application No. 201110319156.2, dated Mar. 5, 2014.
Office Action for Chinese Patent Application No. 201110319156.2, dated Oct. 30, 2014.
Office Action for Chinese Patent Application No. 201110319256.2, dated Apr. 28, 2015.
Extended European Search Report dated Aug. 29, 2013 for European Application No. EP11179619.
Office Action for European Application No. 11179619.9, dated Dec. 1, 2016, 5 pages.

* cited by examiner

METHODS AND APPARATUS FOR AUTOMATICALLY PROVISIONING RESOURCES WITHIN A DISTRIBUTED CONTROL PLANE OF A SWITCH

CROSS-REFERENCES TO RELATED APPLICATIONS

This application is a Continuation of, and claims priority to and the benefit of, U.S. patent application Ser. No. 12/969,057, filed Dec. 15, 2010 (now U.S. Pat. No. 9,240,923), and entitled "METHODS AND APPARATUS FOR AUTOMATICALLY PROVISIONING RESOURCES WITHIN A DISTRIBUTED CONTROL PLANE OF A SWITCH," which in turn claims priority to, and the benefit of U.S. Provisional Patent Application Ser. No. 61/316,720, filed on Mar. 23, 2010, and entitled "Methods And Apparatus Related To Distributed Control Plane Switch Management." The entire contents of the aforementioned applications are herein incorporated by reference.

BACKGROUND

Some embodiments described herein relate generally to distributed switch fabric systems, and, in particular, to automatically provisioning resources and transmitting forwarding-state information in a distributed switch fabric system.

Some known networking systems use a targeted routing protocol to distribute forwarding-state information between different nodes within the networking system. Such known networking systems, however, do not automatically provision the nodes of the network system. Similarly stated, such known networking systems do not automatically provide identifiers and/or addresses of each node to the other nodes within the networking system. Accordingly, to transmit forwarding-state information between the nodes within the networking system, a system administrator manually configures each node within the networking system with the addresses and/or identifiers of the remaining nodes within the networking system.

In networking systems having a large number of nodes and/or in networking systems in which the topology frequently changes, manually configuring each node within the system can be time and/or labor intensive. Additionally, errors can be accidentally input into a configuration file by the system administrator during manual configuration.

Accordingly, a need exists for apparatus and methods to automatically provision a switch fabric system such that the nodes within the switch fabric system can exchange forwarding-state information using a targeted protocol.

SUMMARY

In some embodiments, a network management module is operatively coupled to a set of edge devices that are coupled to a set of peripheral processing devices. The network management module can receive a signal associated with a broadcast protocol from an edge device from the set of edge devices in response to that edge device being operatively coupled to a switch fabric. The network management module can provision that edge device in response to receiving the signal. The network management module can define multiple network control entities at the set of edge devices such that each network control entity from the multiple network control entities can provide forwarding-state information associated with at least one peripheral processing device from the set of peripheral processing devices to at least one remaining network control entity from the multiple network control entities using a selective protocol.

DETAILED DESCRIPTION

Figure 1:
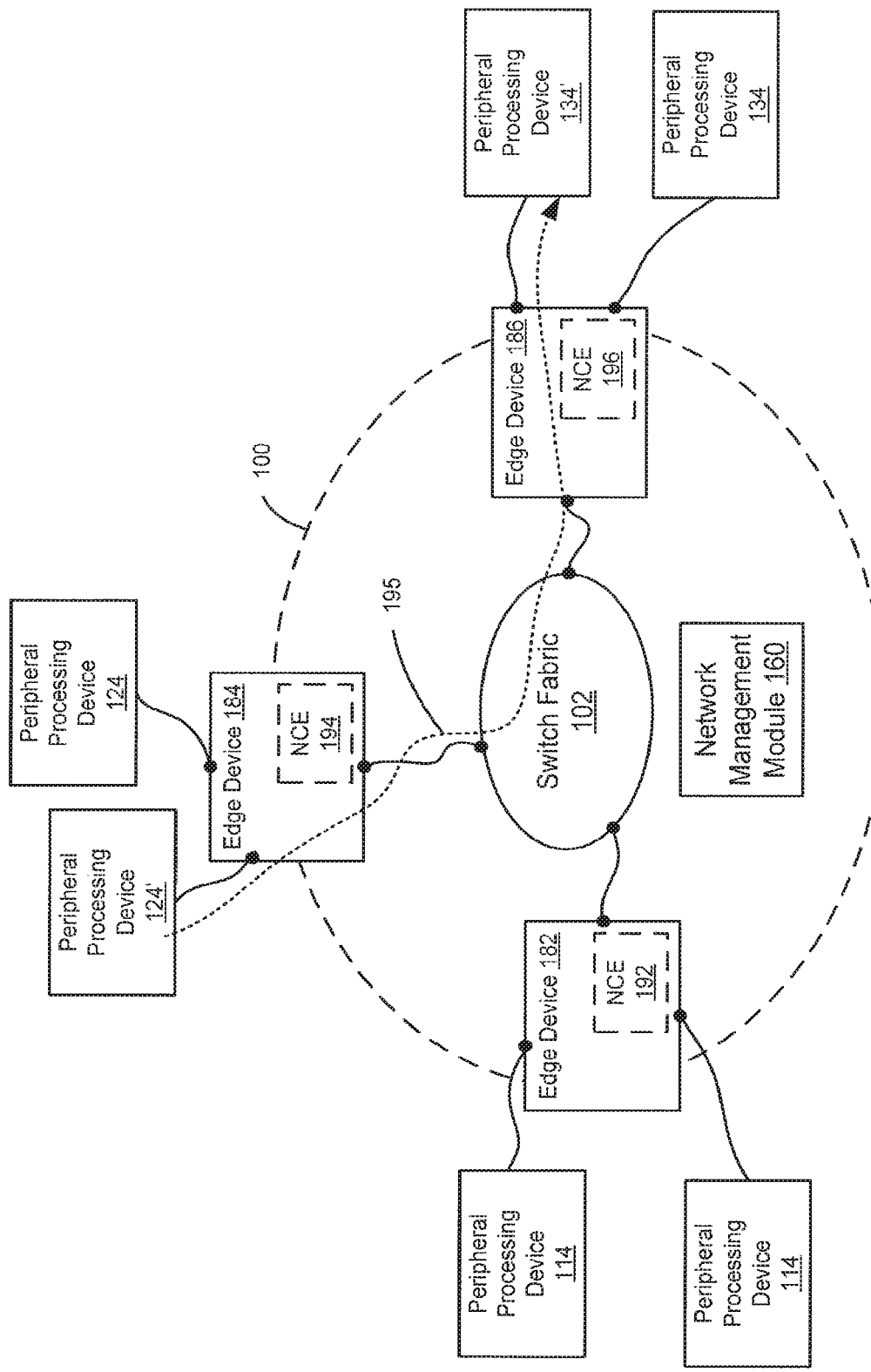
FIG. 1 is a schematic illustration of a switch fabric system, according to an embodiment.

In some embodiments, a network management module is operatively coupled to a set of edge devices coupled to a set of peripheral processing devices. The network management module can receive a signal associated with a broadcast protocol from an edge device from the set of edge devices in response to that edge device being operatively coupled to a switch fabric. The network management module can provision that edge device in response to receiving the signal. The network management module can define multiple network control entities at the set of edge devices such that each network control entity from the multiple network control entities can provide forwarding-state information associated with at least one peripheral processing device from the set of peripheral processing devices to at least one remaining network control entity from the multiple network control entities using a selective protocol.

By automatically provisioning each edge device using a broadcast protocol, an identifier and/or address associated with each network control entity can be automatically provided to the other network control entities within a switch fabric system. Accordingly, each network control entity within the switch fabric system can provide forwarding-state information to other network control entities within the switch fabric system without a system operator and/or administrator manually configuring the network control entities as peers. For example, Intermediate System-to-Intermediate System (IS-IS) can be used with Type Length Value (TLV) fields to configure the network control entities as Border Gateway Protocol (BGP) peers. BGP-format messages can then be used to transmit the forwarding-state information between the network control entities.

In some embodiments, a non-transitory processor-readable medium stores code representing instructions to cause a processor to send a first signal indicating that an edge device has been operatively coupled to a switch fabric system defining multiple virtual switch fabric systems. The first signal is based on a broadcast protocol. The code represents instructions to cause the processor to receive a second signal from a network management module. The second signal causes the edge device to initiate a first network control entity at the edge device. The second signal assigns to the first network control entity a device identifier and a virtual switch fabric system identifier associated with a virtual switch fabric system from the multiple virtual switch fabric systems. The first network control entity manages at least a portion of the edge device. The code represents instructions to cause the processor to send, using the first network control entity, forwarding-state information associated with a peripheral processing device operatively coupled to the edge device to a second network control entity associated with the virtual switch fabric system, using a selective protocol.

In some embodiments, a switch fabric system includes a set of edge devices associated with a network and operatively coupled to a switch fabric and multiple peripheral processing devices. A first edge device from the set of edge devices can send a broadcast signal to a set of devices associated with the network when the first edge device is initially coupled to the network. A network management module can automatically provision the first edge device from the set of edge devices in response to receiving the broadcast signal. The network management module defines a first network control entity at the first edge device from the set of edge devices and a second network control entity at a second edge device from the set of edge devices. A first set of peripheral processing devices from the multiple peripheral processing devices is associated with the first network control entity, and a second set of peripheral processing devices from the multiple peripheral processing devices is associated with the second network control entity. The first network control entity sends forwarding-state information associated with the first set of peripheral processing devices to the second network control entity using a selective protocol.

Embodiments shown and described herein are often discussed in reference to multiple layers (e.g., data link layer, network layer, physical layer, application layer, etc.). Such layers can be defined by open systems interconnection (OSI) model. Accordingly, the physical layer can be a lower level layer than the data link layer. Additionally, the data link layer can be a lower level layer than the network layer and the application layer. Further, different protocols can be associated with and/or implemented at different layers within the OSI model. For example, an Ethernet protocol, a Fibre Channel protocol and/or a cell-based protocol (e.g., used within a data plane portion of a communications network) can be associated with and/or implemented at a data link layer, while a Border Gateway Protocol (BGP) can be associated with and/or implemented at a higher layer, such as, for example, an application layer. While BGP can be implemented at the application layer, it can be used, for example, to send forwarding-state information used to populate a routing table associated with a network layer.

As used herein, the term "physical hop" can include a physical link between two modules and/or devices. For example, a communication path operatively coupling a first module with a second module can be said to be a physical hop. Similarly stated, a physical hop can physically link the first module with the second module.

As used herein, the term "single physical hop" can include a direct physical connection between two modules and/or devices in a system. Similarly stated, a single physical hop can include a link via which two modules are coupled without intermediate modules. Accordingly, for example, if a first module is coupled to a second module via a single physical hop, the first module can send data packets directly to the second module without sending the data packets through intervening modules.

As used herein, the term "single logical hop" means a physical hop and/or group of physical hops that are a single hop within a network topology associated with a first protocol (e.g., a first data link layer protocol). Similarly stated, according to the network topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol (e.g., a second data link layer protocol) can use the destination address of the first protocol (e.g., the first data link layer protocol) to route a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device. In some embodiments, for example, the first protocol can be a packet-based data link layer protocol (i.e., that transmits variable length data packets and/or frames) and the second protocol can be a cell-based data link layer protocol (i.e., that transmits fixed length data cells and/or frames).

In some embodiments, a switch fabric can function as part of a single logical hop (e.g., a single large-scale consolidated layer-2 (L2)/layer-3 (L3) switch). Portions of the switch fabric can be physically distributed across, for example, many chassis and/or modules interconnected by multiple physical hops. In some embodiments, for example, a processing stage of the switch fabric can be included in a first chassis and another processing stage of the switch fabric can be included in a second chassis. Both of the processing stages can logically function as part of a single consolidated switch (e.g., within the same logical hop according to a first protocol) but include a separate single physical hop between respective pairs of processing stages. Similarly stated, each stage within a switch fabric can be connected to adjacent stage(s) by physical links while operating collectively as a single logical hop associated with a protocol used to route data outside the switch fabric. Additionally, packet classification and forwarding associated with a protocol (e.g., Ethernet) used to route data outside a single logical hop need not occur at each stage within the single logical hop. In some embodiments, for example, packet classification and forwarding associated with a first protocol (e.g., Ethernet) can occur prior to a module and/or device sending the data packet to another module and/or device via the single logical hop.

As used in this specification, the singular forms "a," "an" and "the" include plural referents unless the context clearly dictates otherwise. Thus, for example, the term "a module" is intended to mean a single module or a combination of modules.

FIG. 1 is a schematic illustration of a switch fabric system 100, according to an embodiment. The switch fabric system 100 includes a switch fabric 102, network management module 160, and multiple edge devices 182, 184, 186. The switch fabric system 100 operatively couples multiple peripheral processing devices 114, 124, 134 to each other. The peripheral processing devices 114, 124, 134 can be, for example, compute nodes, service nodes, routers, and storage nodes, as described in further detail herein. In some embodiments, for example, the peripheral processing devices 114, 124, 134 include servers, storage devices, gateways, workstations, and/or the like.

The peripheral processing devices 114, 124, 134 can be operatively coupled to the edge devices 182, 184, 186 of the switch fabric system 100 using any suitable connection such as, for example, an optical connection (e.g., an optical cable and optical connectors), an electrical connection (e.g., an electrical cable and electrical connectors) and/or the like. As such, the peripheral processing devices 114, 124, 134 can send data (e.g., data packets, data cells, etc.) to and receive data from the switch fabric system 100 via the edge devices 182, 184, 186. In some embodiments, the connection between the peripheral processing devices 114, 124, 134 and the edge devices 182, 184, 186 is a direct link. Such a link can be said to be a single physical hop link. In other embodiments, the peripheral processing devices can be operatively coupled to the edge devices via intermediate modules. Such a connection can be said to be a multiple physical hop link.

Each edge device 182, 184, 186 can be any device that operatively couples peripheral processing devices 114, 124, 134 to the switch fabric 102. In some embodiments, for example, the edge devices 182, 184, 186 can be access switches, input/output modules, top-of-rack devices and/or the like. Structurally, the edge devices 182, 184, 186 can function as both source edge devices and destination edge devices. Accordingly, the edge devices 182, 184, 186 can send data (e.g., a data stream of data packets and/or data cells) to and receive data from the switch fabric 102, and to and from the connected peripheral processing devices 114, 124, 134.

In some embodiments, the edge devices 182, 184, 186 can be a combination of hardware modules and software modules (executing in hardware). In some embodiments, for example, each edge device 182, 184, 186 can include a field-programmable gate array (FPGA), an application specific integrated circuit (ASIC), a digital signal processor (DSP) and/or the like.

Each of the edge devices 182, 184, 186 can communicate with the other edge devices 182, 184, 186 via the switch fabric 102. Specifically, the switch fabric 102 provides any-to-any connectivity between the edge devices 182, 184, 186 at relatively low latency. For example, switch fabric 102 can transmit (e.g., convey) data between edge devices 182, 184, 186. In some embodiments, the switch fabric 102 can have at least hundreds or thousands of ports (e.g., egress ports and/or ingress ports) through which edge devices such as edge devices 182, 184, 186 can transmit and/or receive data.

Figure 2:
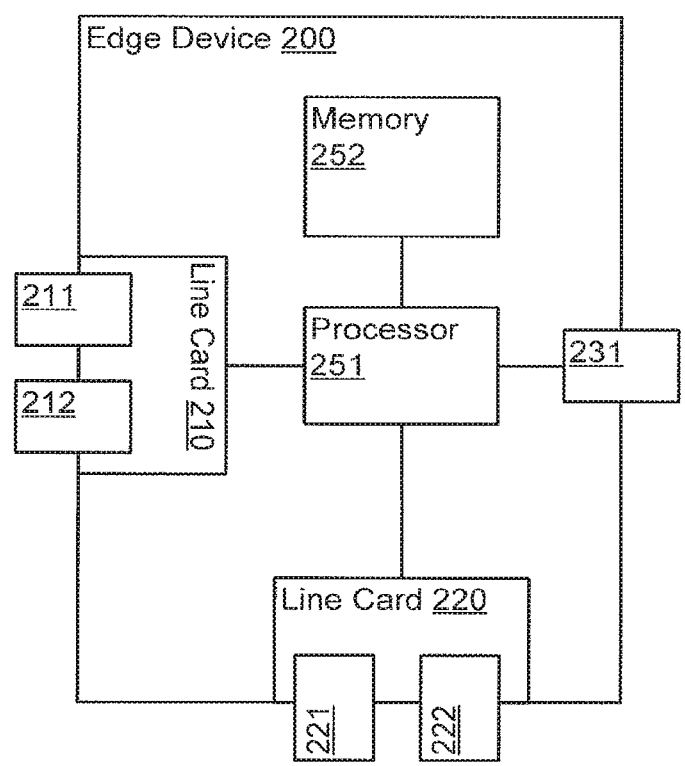
FIG. 2 is a schematic illustration of an edge device, according to another embodiment.

FIG. 2 is a system block diagram of an edge device 200 similar to the edge devices 182, 184, 186. The edge device 200 includes processor 251, memory 252, line card 210, line card 220, and port 231. Processor 251 is operatively coupled to memory 252, line card 210, line card 220 and port 231. Line card 210 includes ports 211 and 212. Line card 220 includes ports 221 and 222. In some embodiments, line cards 210 and/or 220 include one or more processors and/or memories (not shown).

Ports 211, 212, 221 and 222 can be similar to the ports of the edge devices 182, 184, 186 operatively coupled to peripheral processing devices 114, 124, 134. For example, ports 211, 212, 221 and 222 can implement a physical layer using twisted-pair electrical signaling via electrical cables or fiber-optic signaling via fiber-optic cables. In some embodiments, some of ports 211, 212, 221 and 222 implement one physical layer such as twisted-pair electrical signaling and others of ports 211, 212, 221 and 222 implement a different physical layer such as fiber-optic signaling. Furthermore, ports 211, 212, 221 and 222 can be configured to allow edge device 200 to communicate with peripheral processing devices, such as, for example, computer servers (servers), via a common protocol such as Ethernet or Fibre Channel. In some embodiments, some of ports 211, 212, 221 and 222 implement one protocol such as Ethernet and others of ports 211, 212, 221 and 222 implement a different protocol such as Fibre Channel. Thus, edge device 200 can be in communication with multiple peripheral processing devices using homogeneous or heterogeneous physical layers and/or protocols via ports 211, 212, 221 and 222.

Port 231 can be configured to be in communication with other edge devices via a communications network such as switch fabric 102. Port 231 can be part of one or more network interface devices (e.g., a 40 Gigabit (Gb) Ethernet interface, a 100 Gb Ethernet interface, etc.) through which the edge device 200 can send signals to and/or receive signals from a communications network. The signals can be sent to and/or received from the communications network via an electrical link, an optical link and/or a wireless link operatively coupled to the edge device 200. In some embodiments, the edge device 200 can be configured to send signals to and/or receive signals from the communications network based on one or more protocols (e.g., an Ethernet protocol, a multi-protocol label switching (MPLS) protocol, a Fibre Channel protocol, a Fibre-Channel-over Ethernet protocol, an Infiniband-related protocol, a cell-base protocol).

In some embodiments, port 231 can implement a different physical layer and/or protocol than those implemented at ports 211, 212, 221 and 222. For example, port 211, 212, 221 and 222 can be configured to communicate with peripheral processing devices using a data link layer protocol based on data packets, and port 231 can be configured to communicate via a switch fabric (e.g., switch fabric 102) using a data link layer protocol based on data cells. Said differently, edge device 200 can be an edge device of a network switch such as a distributed network switch.

In some embodiments, the edge device 200 can be configured to prepare a data packet (e.g., an Ethernet frame and/or packet) to enter a data plane portion of a communications network (e.g., switch fabric 102). For example, the edge device 200 can be configured to forward, classify, and/or modify the packet encapsulation (e.g., modify, add and/or remove a header portion, footer portion and/or any other identifier included within the data packet) of a data packet prior to sending the data packet to the communications network. Additionally, the edge device 200 can be configured to partition and/or divide the data packet into data cells (e.g., having fixed length payloads) prior to sending the data cells to the switch fabric. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Returning to FIG. 1, the edge devices 182, 184, 186 can host one or more network control entities 192, 194, 196 to manage the ports of the edge devices 182, 184, 186. For example, as described in further detail herein, the edge device 182 can host the network control entity 192 to manage the ports to which the peripheral processing devices 114 are coupled, the edge device 184 can host the network control entity 194 to manage the ports to which the peripheral processing devices 124 are coupled, and the edge device 186 can host the network control entity 196 to manage the ports to which the peripheral processing devices 134 are coupled. As such the peripheral processing devices 114, 124, and 134 can be said to be associated with the network control entities 192, 194, and 196, respectively. Each network control entity 192, 194, 196 can be a process, application, virtual machine and/or some other software module (executing in hardware), or a hardware module, that is executed at the edge devices 182, 184, 186, respectively.

Each network control entity 192, 194, 196 can send and/or distribute forwarding-state information (e.g., port identifiers, network segment identifiers, peripheral processing device identifiers, edge device identifiers, data plane module identifiers, next hop references, next hop identifiers, etc.) over the control plane for a set of ports that network control entity 192, 194, 196 manages. As discussed in further detail herein, for example, the network control entity 196 can send, via the control plane, forwarding-state information associated with the port at edge device 182 to which the peripheral processing device 134' is coupled, to the network control entity 194. Using the received forwarding-state information, the edge device 184 can address and send a data packet received from the peripheral processing device 124' to the edge device 186, via the switch fabric 102.

In some embodiments and as described in further detail herein, the network control entity 196 can send forwarding-state information to the network control entity 194 using a targeted higher level protocol (e.g., an application layer protocol) such as, for example, Boarder Gateway Protocol (BGP). In such embodiments, the network control entity 196 can send the forwarding-state information using such a higher level protocol in conjunction with any suitable lower level protocol (e.g., a data link layer protocol), such as, for example, Ethernet and/or Fibre Channel. While BGP can be implemented at the application layer, it can be used to send forwarding-state information used to populate a routing table (e.g., at the network control entity 194) associated with a network layer. Using a targeted protocol, such as BGP, the network control entity 192 can send the forwarding-state information to specific network control entities (e.g., 194) while refraining from sending the forwarding-state information to other network control entities (e.g., 192).

In some embodiments, a network control entity 192, 194, 196 can control and/or manage ports at an edge device 182, 184, 186 at which the network control entity 192, 194, 196 is located. In other embodiments, a network control entity can also control and/or manage ports and/or data plane modules at an edge device other than the edge device at which the network control entity is located. In such embodiments, the network management module 160 has flexibility to assign each port to a network control entity 192, 194, 196 based on processing capacity, as described in further detail herein. Additionally, in such embodiments, the network management module 160 is not constrained by the physical location of the network control entities 192, 194, 196 and/or the ports when assigning the ports to a network control entity 192, 194, 196. Moreover, while each edge device 182, 184, 186 is shown in FIG. 1 as hosting a single network control entity 192, 194, 196, in other embodiments, each edge device 182, 184, 186 can host and/or include any number of network control entities.

In some embodiments, the ports associated with multiple network control entities 192, 194, 196 can form a virtual switch fabric system. Such a virtual switch fabric system can be a group and/or collection of network control entities (and their associated ports) that share forwarding-state information with the other network control entities within the virtual switch fabric system, but not those network control entities outside of the same virtual switch fabric system. A rule and/or policy implemented at a network control entity 192, 194, 196 and/or the network management module 160 can prevent and/or restrict a network control entity of a first virtual switch fabric system from sending forwarding-state information to a network control entity of a second virtual switch fabric system. Accordingly, because forwarding-state information is not exchanged between the network control entities of the first virtual switch fabric system and the network control entities of the second virtual switch fabric system, the peripheral processing devices operatively coupled to ports associated with the network control entities of the first virtual switch fabric system do not send data packets to the peripheral processing devices operatively coupled to ports associated with the network control entities of the second virtual switch fabric system. For example, a first organization assigned to a first virtual switch fabric system can protect data transmitted over switch fabric 102 from being sent to and/or viewed by a second organization associated with a second virtual switch fabric system. Each network control entity within a given virtual switch fabric system can be assigned a virtual switch fabric identifier by network management module 160. In some embodiments, the virtual switch fabric identifier can be provided by network management module 160. In some embodiments, a virtual switch fabric system can also be referred to as a network segment, a sub-network or a virtual network.

In some embodiments, network management module 160 can be a process, application, virtual machine and/or some other software module (executing in hardware), or a hardware module, that is executed at a compute node (not shown in FIG. 1), an edge device 182, 184, 186, and/or any other device within the switch fabric system 100. In other embodiments, network management module 160 can include a field-programmable gate array (FPGA), an application specific integrated circuit (ASIC), a digital signal processor (DSP) and/or the like. Although network management module 160 can be logically centralized, the implementation of network management module 160 can be highly distributed, for example, for reliability. For example, portions of network management module 160 can be physically distributed across, for example, many chassis.

The network management module 160 can be operatively coupled to the edge devices 182, 184, 186 via a control plane (not shown in FIG. 1) of the switch fabric system 100. In some embodiments, such a control plane can include direct, single physical hop connections between the network management module 160 and the edge devices 182, 184, 186. In other embodiments, the control plane includes a multiple physical hop network that operatively couples the network management module 160 with the edge devices 182, 184, 186.

Network management module 160 can provision edge devices 182, 184, 186 when the edge devices 182, 184, 186 are initially coupled to the switch fabric system 100. More specifically, as described in further detail herein, when an edge device is initially connected to the switch fabric system 100, network management module 160 can assign a device identifier to this newly connected edge device. Such a device identifier can be, for example, a physical address (e.g., media access control (MAC), etc.), a logical address (e.g., internet protocol (IP), etc.) and/or any other suitable address. In some embodiments the device identifier is assigned using a dynamic address assigning protocol (e.g., Dynamic Host Configuration Protocol (DHCP), etc.). As discussed in further detail herein, an initiation signal and/or a provisioning signal can be formatted and sent from an edge device 182, 184, 186 to the network management module 160 or from the network management module 160 to an edge device 182, 184, 186, respectively, using a broadcast protocol such as, for example, an Intermediate System to Intermediate System (IS-IS) protocol. In such embodiments, provisioning information can be encoded as a type-length-value (TLV) element inside the initiation signal and/or provisioning signal.

In some embodiments, the network management module 160 can assign and/or associate other identifiers to the newly-connected edge device. In some embodiments, for example, the network management module 160 can assign a virtual switch fabric system identifier, associating that edge device with a particular virtual switch fabric system. In other embodiments, any other identifier and/or association can be assigned to the newly-connected edge device by the network management module 160.

In some embodiments, the network management module 160 can also monitor an available processing capacity of each network control entity 182, 184, 186 and initiate and/or terminate network control entities 182, 184, 186 when an available processing capacity of a network control entity 182, 184, 186 crosses (e.g., falls below) a first threshold and/or crosses (e.g., exceeds) a second threshold, respectively. Such initiation and termination of network control entities can be similar to that described in co-pending U.S. patent application Ser. No. 12/968,848, filed on the same date, and entitled "Methods and Apparatus for Dynamic Resource Management within a Distributed Control Plane of a Switch," which is incorporated herein by reference in its entirety. Additionally, the network management module 160 can reassign ports to different network control entities as the available processing capacities of the network control entities 182, 184, 186 fluctuate.

The switch fabric 102 can be any suitable switch fabric that operatively couples the edge devices 182, 184, 186 to the other edge devices 182, 184, 186. In some embodiments, for example, the switch fabric 102 can be a Clos network (e.g., a non-blocking Clos network, a strict sense non-blocking Clos network, a Benes network) having multiple stages of switching modules (e.g., integrated Ethernet switches). In some embodiments, for example, the switch fabric 102 shown in FIG. 1 can include any number of stages. In such embodiments, for example, the switch fabric 102 can include five, seven or nine stages. The switch fabric 102 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

In some embodiments, the switch fabric 102 can be (e.g., can function as) a single consolidated switch (e.g., a single large-scale consolidated L2/L3 switch). In other words, the switch fabric 102 can operate as a single logical entity (e.g., a single logical network element). Similarly stated, the switch fabric 102 can be part of a single logical hop between a first edge device 182, 184, 186 and a second edge device 182, 184, 186 (e.g., along with the data paths between the edge devices 182, 184, 186 and the switch fabric 102). The switch fabric 102 can connect (e.g., facilitate communication between) the peripheral processing devices 114, 124, 134. In some embodiments, the switch fabric 102 can communicate via interface devices (not shown) that transmit data at a rate of at least 10 Gb/s. In some embodiments, the switch fabric 102 can communicate via interface devices (e.g., Fibre-Channel interface devices) that transmit data at a rate of, for example, 2 Gb/s, 4, Gb/s, 8 Gb/s, 10 Gb/s, 40 Gb/s, 100 Gb/s and/or faster link speeds.

Although the switch fabric 102 can be logically centralized, the implementation of the switch fabric 102 can be highly distributed, for example, for reliability. For example, portions of the switch fabric 102 can be physically distributed across, for example, many chassis. In some embodiments, for example, a processing stage of the switch fabric 102 can be included in a first chassis and another processing stage of the switch fabric 102 can be included in a second chassis. Both of the processing stages can logically function as part of a single consolidated switch (e.g., within the same logical hop) but have a separate single physical hop between respective pairs of processing stages.

In use, when an edge device (e.g., edge device 186) is initially connected to the switch fabric system 100, that edge device 186 can transmit an initiation signal over the control plane using a broadcast protocol (e.g., Intermediate System (IS-IS), Open Shortest Path First (OSPF), etc.) to the other devices connected to the control plane (e.g., network management module 160, edge devices 182, 184, 186) to indicate and/or advertise its presence. As described in further detail herein, the network management module 160 sends a provisioning signal back to that edge device 186. As discussed above and in further detail herein, such a provisioning signal can provide a device identifier and/or any other appropriate identifier and/or information to the edge device 186. Additionally, in some embodiments, the provisioning signal can initiate a network control entity 196 at the edge device 186 and assign that network control entity 196 to a virtual switch fabric system. In assigning the network control entity 196 to a virtual switch fabric, the network management module 160 can also provide the network control entity 196 an address and/or identifier of each of the other network control entities within that virtual switch fabric system. In other embodiments, the provisioning signal can assign the ports at the edge device 186 to a network control entity at another edge device 182, 184. As described in further detail herein, in some embodiments, such initiation and/or provisioning information can be provided in a TLV portion of an IS-IS message.

After provisioning is complete, the network control entity 196 can use a selective protocol (e.g., Border Gateway Protocol and/or the like) to provide forwarding-state information to the other network control entities associated with the same virtual switch fabric system but not to the network control entities outside of the same virtual switch fabric system. Such forwarding-state information (e.g., port identifiers, network segment identifiers, peripheral processing device identifiers, edge device identifiers, data plane module identifiers, next hop references, next hop identifiers, etc.) includes information related to and/or can be associated with the peripheral processing devices 134 operatively coupled to the edge device 186. The other network control entities associated with the same virtual switch fabric system as the edge device 186 can receive and store the forwarding-state information in a routing, switching and/or lookup table. Because a selective protocol, such as BGP, is used to send the forwarding-state information to the other network control entities, the network control entity 196 sends its forwarding-state information to the network control entities that are part of the same virtual switch fabric system without sending it to network control entities associated with other virtual switch fabric systems. Using a selective protocol also reduces the amount of traffic and/or congestion that would otherwise be on the control plane of the switch fabric system 100.

After forwarding-state information has been exchanged between network control entities of the same virtual switch fabric system, the network control entities can send and/or store the forwarding-state information at a data plane module of the edge devices having ports associated with each of the network control entities. For example, the network control entity 194 can store the forwarding-state information in a routing, switching and/or lookup table associated with a data plane module (not shown) of the edge device 184. More specifically, the network control entity 194 can store the forwarding-state information in a memory at the edge device 184 (e.g., memory 252 of FIG. 2) accessible by the data plane module of the edge device 184.

A data packet (e.g., an Ethernet packet) can be sent between peripheral processing devices 114, 124, 134 associated with the same virtual switch fabric system via the switch fabric system 100. For example, a data packet can be sent from a first peripheral processing device 124' to a second peripheral processing device 134' via path 195 through the data plane of the switch fabric system 100. Peripheral processing device 124' transmits the data packet to the data plane module (not shown) at the edge device 184. Such a data packet includes a header with the device identifier of destination peripheral processing device 134'. The data plane module of the edge device 184 can retrieve the forwarding-state information associated with the peripheral processing device 134' from the lookup, routing and/or switching table stored in a memory of the edge device 184. More specifically, the data plane module at the edge device 184 can use a destination identifier associated with the peripheral processing device 134' and in a header portion of the data packet to query the lookup, routing and/or switching table for the appropriate forwarding-state information. The data plane module can then append such forwarding-state information to the data packet and send the data packet to the switch fabric 102. The switch fabric can use the appended forwarding-state information to route and/or switch the data packet through the switch fabric and to the edge device 186. The edge device 186 can then prepare and send the data packet to the peripheral processing device 134'.

In some embodiments, prior to being sent to the switch fabric 102, the edge device 184 can divide and/or partition the data packet into one or more data cells (e.g., fixed length frames of data). The cells can be forwarded, routed and/or switched to the edge device 186 via the switch fabric 102. The edge device 186 can reassemble the data packet from the data cells prior to sending the data packet to the peripheral processing device 134'.

Figure 3:
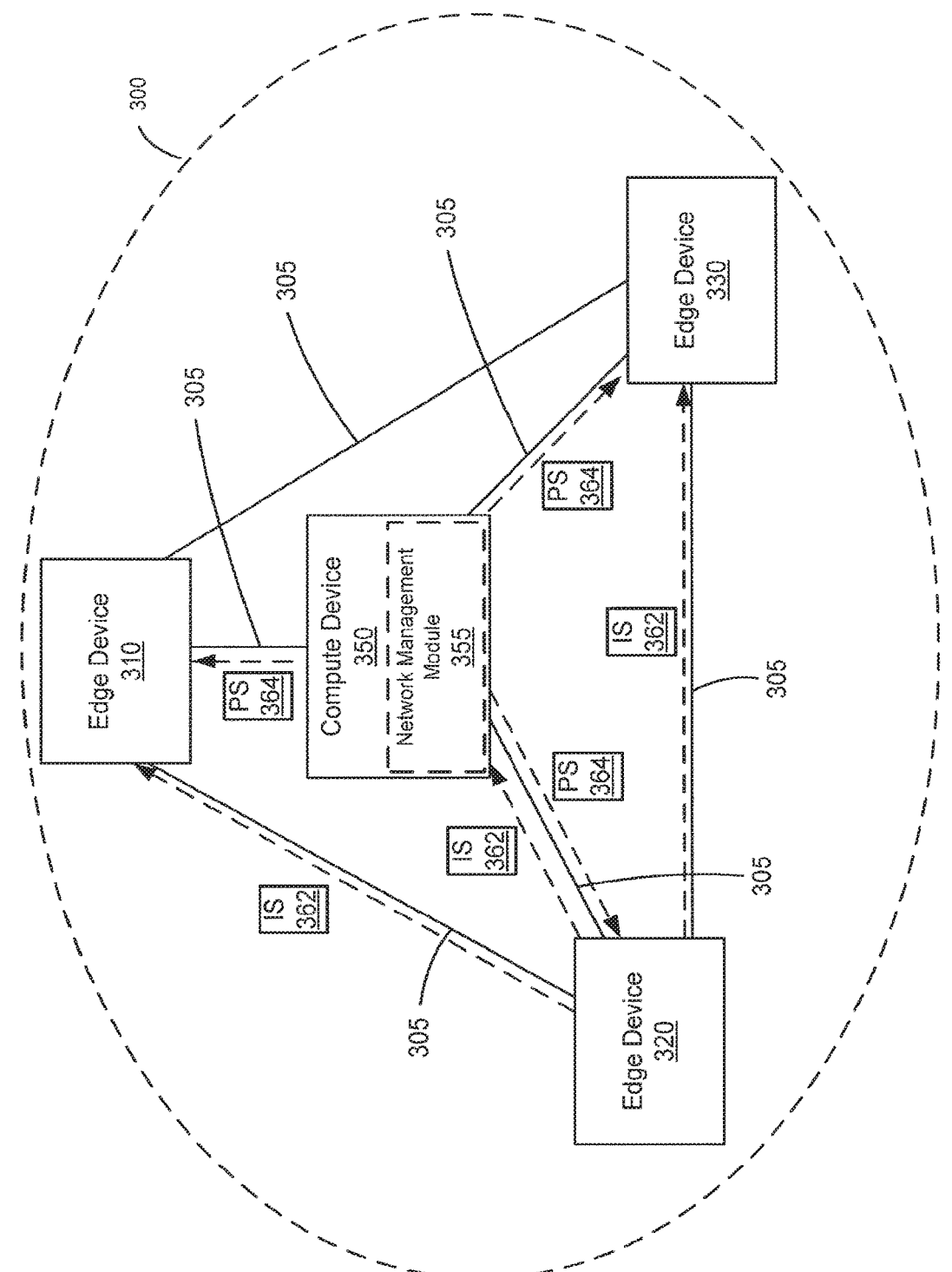
FIG. 3 is a schematic illustration of a control plane of a switch fabric system prior to provisioning, according to another embodiment.
Figure 4:
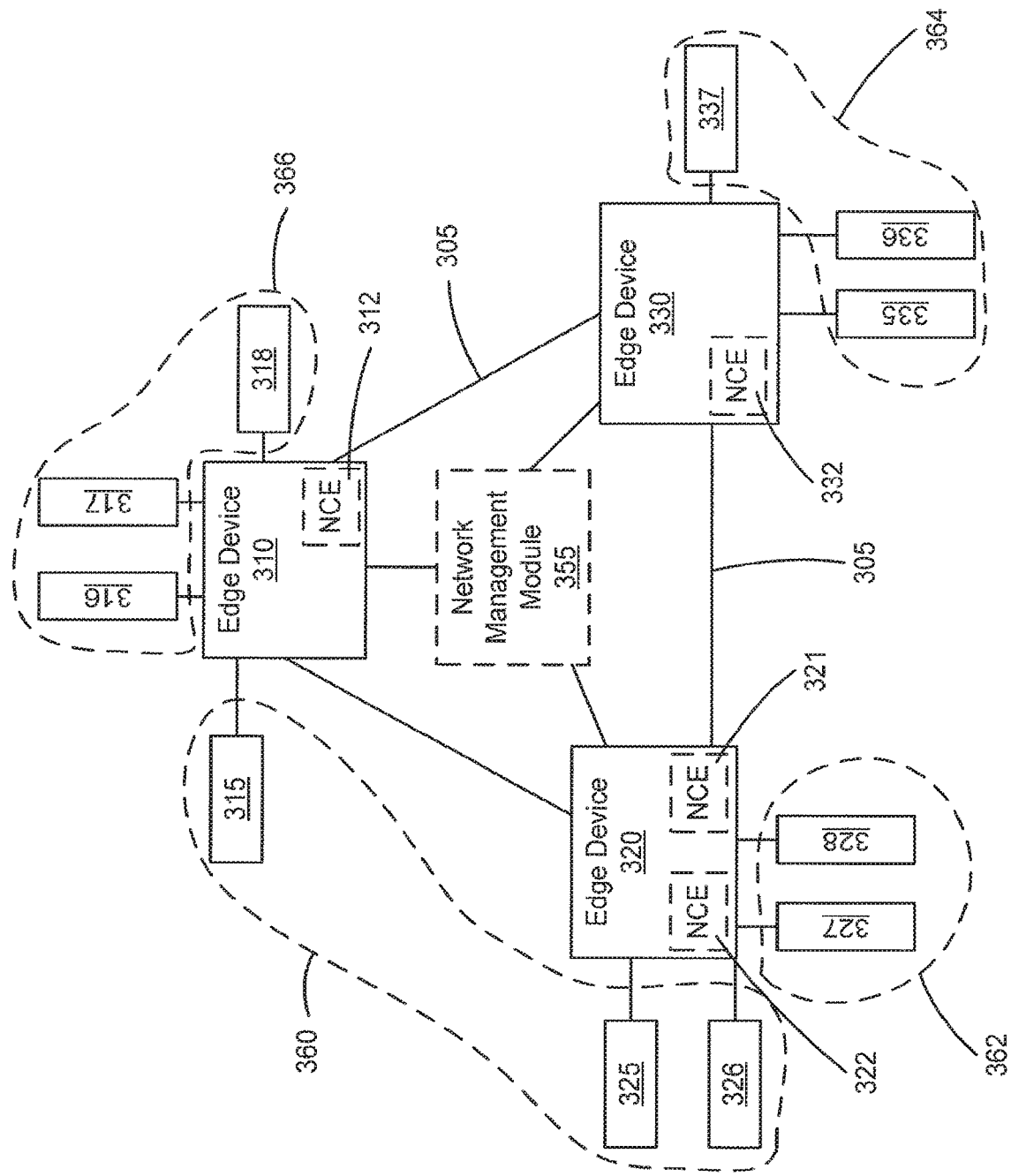
FIG. 4 is a schematic illustration of a physical topology of the control plane of the switch fabric system of FIG. 3, after provisioning.
Figure 5:
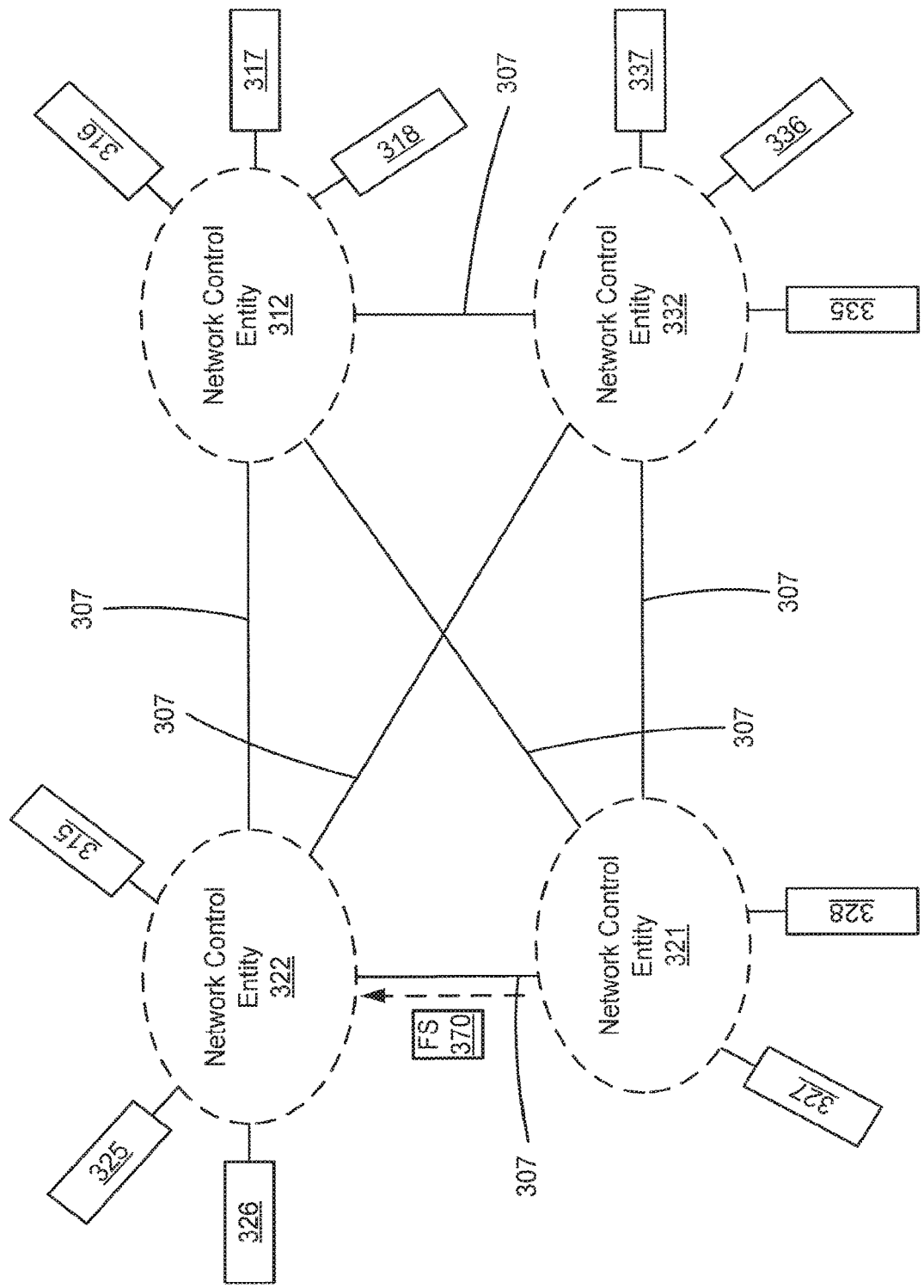
FIG. 5 is a schematic illustration of a logical topology of the control plane of the switch fabric system of FIG. 4, after provisioning.

FIGS. 3-5 are system block diagrams of a control plane 300 of a switch fabric system, similar to switch fabric system 100, according to an embodiment. FIG. 3 illustrates the control plane 300 during provisioning of the edge device 320. Edge devices 310, 320 and 330 are similar to edge devices 182, 184, 186 and 200, and network management module 355 is similar to network management module 160 described above with respect to FIGS. 1 and 2. As shown in FIG. 3, network management module 355 is hosted at a compute device 350. Compute device 350 can include, for example, a field-programmable gate array (FPGA), an application specific integrated circuit (ASIC), a digital signal processor (DSP) and/or the like. In some embodiments, the compute device 350 is a server having a processor running software stored in memory that implements the network management module 355.

Data paths 305 operatively couple the edge devices 310, 320, 330 and the compute device 350 with each other. The data paths 305 can include optical links, electrical links, wireless links and/or the like. Accordingly, the edge devices 310, 320, 330 and/or the compute device 350 can send signals to and/or receive signals from the other edge devices 310, 320, 330 and/or the compute device 350 via the control plane connections (i.e., data paths 305). In some embodiments and as shown in FIG. 3, the connections (i.e., data paths 305) between the edge devices 310, 320, 330 and compute device 350 are direct links. Such links can be said to be single physical hop links. In other embodiments, the connection between each pair of edge devices and/or between an edge device and the compute device can be via intermediate modules using, for example, route reflector(s) (e.g., BGP route reflectors) and/or other nodes within a network. Such a connection can be said to be a multiple physical hop link. In such embodiments, the control plane 300 can be hierarchical, similar to the control planes shown and described in co-pending U.S. patent application Ser. No. 12/968,957, filed on the same date, and entitled "Methods and Apparatus Related to a Switch Fabric System having a Multi-Hop Distributed Control Plane and a Single-Hop Data Plane," which is incorporated herein by reference in its entirety.

In some embodiments, an address and/or identifier (e.g., a MAC address, IP address, etc.) of network management module 355 can be dynamic. Similarly stated, the address and/or identifier of the network management module 355 is not fixed and can change each time the network management module 355 and/or the compute device 350 reboots and/or is reconfigured. In such a manner, the address of the network management module 355 can adapt and/or be established according to the characteristics and/or requirements of the specific switch fabric system. In other embodiments, the address and/or identifier of the network management module 355 can be fixed such that it remains the same each time the compute device 350 reboots and/or is reconfigured.

Additionally, as described in further detail herein, the network management module 355 can be configured to listen for initiation signals (e.g., initiation signal 362) sent over the control plane on a fixed multicast address. In some embodiments, such a fixed multicast address can be the same each time the network management module 355 and/or the compute device 350 reboots and/or is reconfigured. In other embodiments, the multicast address can be dynamic such that it does not remain the same each time the network management module 355 and/or the compute device 350 reboots and/or is reconfigured.

In use, a network administrator and/or other user can physically couple an edge device (e.g., edge device 320) to the switch fabric system. Such a physical connection couples the edge device 320 to the compute device 350 and the other edge devices 310, 330 within in the control plane 300 of the switch fabric system. Similarly stated, physical connections (e.g., data paths 305) are established between the edge device 320 and the compute device 350 and the other edge devices 310, 330. Additionally, in some embodiments, the edge device 320 is operatively coupled to a data plane of the switch fabric system (i.e., a switch fabric similar to switch fabric 102) when the network administrator and/or other user physically couples the edge device 320 to the switch fabric system.

After the edge device 320 is physically coupled to the switch fabric system, the edge device 320 can send within the control plane 300 an initiation signal 362 to the other devices (e.g., edge devices 310, 330 and compute device 350) on the fixed multicast address using a broadcast protocol (e.g., IS-IS, OSPF, etc.). Similarly stated, the edge device 320 can broadcast its presence in the switch fabric system over the control plane 300. Because a broadcast protocol (e.g., IS-IS, OSPF, etc.) is used to send the initiation signal, the network management module 355 can have a dynamic address and/or identifier, as described above. In other embodiments, the network management module 355 can have a fixed address and/or identifier and the initiation signal can be sent to that address using a targeted protocol (e.g., the initiation signal can be sent to the network management module 355 without being sent to the other edge devices 310, 330).

The initiation signal 362 can include any suitable information to be used by the network management module 355 to provision the edge device 320. In some embodiments, for example, the initiation information can include a type of ports (e.g., Fibre-Channel, Ethernet, etc.) of the edge device 320, the speed of the ports of the edge device 320, information associated with the peripheral processing devices operatively coupled to the ports of the edge device, the port, slot and/or chassis of the switch fabric system to which the edge device 320 is coupled, and/or the like.

In some embodiments, such initiation information can be included within a type-length-value (TLV) portion of an IS-IS message. A TLV portion of a message can represent the data by indicating the type of data (e.g., type of ports, speed of the ports, etc.), the length of the data (e.g., the size), followed by the value of the data (e.g., an identifier indicating the type of ports, the speed of the ports, etc.). Accordingly, using TLV portions of a message, the types, lengths and values of the initiation information can be easily parsed by the network management module.

The network management module 355 can actively listen on and/or monitor a fixed multicast address for initiation signals, such as initiation signal 362. Accordingly, when the edge device 320 sends the initiation signal 362 on the fixed multicast address, the network management module 355 can receive the initiation signal 362. In some embodiments, the other edge devices 310, 330 are configured to discard initiation signals received on the fixed multicast address. In other embodiments, the other edge devices 310, 330 can receive the initiation signals at the fixed multicast address and store the information contained therein.

The network management module 355 can provision the edge device 320 based on the initiation signal 362. In some embodiments, for example, the network management module 355 can assign a device identifier and/or address to the edge device 320 and/or the ports of the edge device 320. Additionally, as shown in FIGS. 4 and 5 and as described in further detail herein, the network management module 355 can also initiate one or more network control entities 321, 322 at the edge device 320 and assign ports 325-328 at that edge device 320 to the network control entities 321, 322. Additionally, the network management module 355 can assign one or more ports 315 at another edge device 310 to one or more of the network control entities 322 at the edge device 320. Similarly, one or more of the ports at the edge device 320 can be assigned to a network control entity at another edge device. The network management module 355 can also assign the network control entities 321, 322 to be initiated at the edge device 320 addresses and/or identifiers (e.g., a MAC address and/or an IP address) as well as assigning the network control entities 321, 322 to a virtual switch fabric system. In some embodiments, the network management module 355 can assign the network control entities 321, 322 an identifier from which each network control entity 321, 322 can derive a MAC address and/or an IP address.

Returning to FIG. 3, such provisioning information, rules, policies and/or instructions can be sent by the network management module 355 to the edge devices 310, 320, 330 in response to the initiation signal 362. Specifically, a provisioning signal 364 can be sent to each edge device 310, 320, 330 containing such information using a broadcast protocol (e.g., IS-IS, OSPF, etc.). Similar to the initiation information, in some embodiments, such provisioning information, rules, policies and/or instructions can be encoded as a TLV portion of an IS-IS message. In such embodiments, the provisioning information can be easily parsed by the edge devices 310, 320, 330.

In some embodiments, the provisioning signal 364 is sent to the same multicast address as the initiation signal 362. In other embodiments, the provisioning signal 364 is sent to a different multicast address as the initiation signal 362. In either embodiment, the edge devices 310, 320, 330 (and/or the network control entities 312, 321, 322, 332 at the edge devices 310, 320, 330) can listen to and/or monitor the appropriate multicast address to receive the provisioning signal 364. As described in further detail herein, use of such a broadcast protocol allows the switch fabric system to be automatically provisioned such that network control entities within the switch fabric system can share forwarding-state information using a targeted protocol such as the Boarder Gateway Protocol (BGP). Similarly stated, the routing tables at the network control entities 312, 321, 322, 332 at the edge devices 310, 320, 330 can be automatically populated with the addresses and/or identifiers of the other network control entities 312, 321, 322, 332. As such, a system administrator does not need to manually configure the network control entities 312, 321, 322, 332 as BGP peers.

Upon receiving such provisioning information, for example, the edge device 320 can initiate the network control entities 321, 322 and/or the other edge devices 310, 330 can store the addresses and/or identifiers of the network control entities 321, 322. In some embodiments, any other suitable rules, policies, and/or identifiers can be provided to the edge device 320 to be provisioned and/or the other edge devices 310, 330 via the provisioning signal 364.

In some embodiments, before storing and/or implementing the information and/or instructions within the provisioning signal 364, the edge devices 310, 330 can parse the received provisioning signal 364 for virtual switch fabric identifiers associated with the network control entities 321, 322 to be initiated at the edge device 320. If the edge device 310 or 330 does not have a network control entity associated with the same virtual switch fabric system as one of the network control entities 321, 322, that edge device 310 or 330 can discard the provisioning signal 364. Alternatively, if that edge device 310 or 330 includes a network control entity associated with the same virtual switch fabric system as at least one of the network control entities 321, 322, that edge device 310 or 330 can store and/or implement the relevant portion of the provisioning signal 364.

After the edge device 320 has been provisioned (e.g., the network control entities 321, 322 initiated, the addresses and/or identifiers of the edge device 320 and/or the network control entities 321, 322 made available to the other edge devices 310, 330 and/or network control entities 312, 332, rules and/or policies implemented, and/or the like), the other edge devices 310 and/or the network control entities 312, 332 at the other edge devices 310, 330 can send addresses and/or identifiers to the edge device 320 and/or the network control entities 321, 322. In some embodiments, network control entities associated with a same virtual switch fabric system as the network control entities 321, 322 send such information to the network control entities 321, 322, while network control entities not associated with the same virtual switch fabric system do not send such information. In some embodiments, such information can be sent similar to forwarding-state information using a targeted protocol such as BGP. In other embodiments, such information is broadcast on a multicast address using a broadcast protocol, such as IS-IS. In such a manner the edge device 320 and/or the network control entities 321, 322 can receive the addresses and/or identifiers of the other edge devices 310, 330 within the switch fabric system.

FIGS. 4 and 5 illustrate the control plane 300 after the edge device 320 has been provisioned. FIG. 4 is a schematic illustration of a physical topology of the control plane 300. As shown in FIG. 4, the edge device 310 includes ports 315-318, the edge device 320 includes ports 325-328 and the edge device 330 includes the ports 335-337. The ports 315-318, 325-328, 335-337 can be any suitable ports configured to operatively couple the edge devices 310, 320, 330 to peripheral processing devices (not shown). In some embodiments, for example, the ports 315-318, 325-328, 335-337 can be similar to the ports 211, 212, 221 and 222 shown and described above with respect to FIG. 2.

Each of the edge devices 310, 320, 330 includes at least one network control entity 312, 321, 322, 332 to manage a group of ports 360, 362, 364, 366. Specifically, the edge device 310 includes network control entity 312 that manages the group of ports 366 (i.e., ports 316-318); the edge device 320 includes network control entity 321 that manages the group of ports 362 (i.e., ports 327 and 328) and the network control entity 322 that manages the group of ports 360 (i.e., ports 315, 325 and 326); and the edge device 330 includes network control entity 332 that manages the group of ports 364 (i.e., ports 335-337). While FIG. 4 shows each edge device 310, 320, 330 including at least one network control entity 312, 321, 322, 332, in other embodiments, some edge devices do not include network control entities.

A network control entity can manage forwarding-state information for all ports of an edge device, a subset of ports associated with an edge device, or a set of ports associated with two or more edge devices. For example, the group of ports 366 includes ports 316, 317, 318 located at edge device 310 and managed by network control entity 312, also located at edge device 310. Similarly, the group of ports 362 and the group of ports 364 both include ports 327-328 and 335-337 located at edge devices 320 and 330, respectively, and are managed by network control entities 321 and 332, respectively. The group of ports 360, however, includes ports 315, 325, 326 located at both edge device 310 and edge device 320. As shown in FIG. 4, network control entity 322 located at edge device 320 manages the group of ports 360. In other embodiments, each port of a group of ports is managed by a network control entity not on the same edge device as a port of the group of ports.

As described above, the network management module 355 can reassign network control entities by, for example, sending a provisioning signal over the control plane. For example, a port 315-318, 325-328, 335-337 can be assigned to a different network control entity 312, 322, 332 when available processing capacity at the currently assigned network control entity 312, 322, 332 crosses a threshold. In other embodiments, a port 315-318, 325-328, 335-337 can be reassigned to a different network control entity 312, 322, 332 to improve traffic flow over a portion of the control plane.

Peripheral processing devices can be operatively coupled to the ports 315-318, 325-328, 335-337 of the edge devices 310, 320, 330. Such peripheral processing devices can be similar to the peripheral processing devices 114, 124, 134, shown and described above with respect to FIG. 1. Accordingly, the peripheral processing devices can include compute nodes, service nodes, routers, and/or storage nodes.

FIG. 5 is a schematic illustration of a logical topology of the control plane of the switch fabric system of FIG. 4. As shown in FIG. 5, each network control entity 312, 321, 322, 332 is operatively coupled to the other network control entities 312, 321, 322, 332 via a logical connection 307. Such logical connections 307 can include one or more physical connections, intermediate nodes within the switch fabric system 300 and/or the like.

Each network control entity 312, 321, 322, 332 can send forwarding-state information (e.g., port identifiers, network segment identifiers, peripheral processing device identifiers, edge device identifiers, data plane module identifiers, next hop references, next hop identifiers, etc.) to the other network control entities 312, 321, 322, 332 via the logical connections 307. Consider the following example. The network control entity 321 can detect a change in state at the port 327. For example, after a peripheral processing device (not shown) is initially coupled to the port 327, the peripheral processing device can send forwarding-state information associated with that peripheral processing device to the network control entity 321. In some embodiments, such forwarding-state information can include a peripheral processing device identifier associated with the peripheral processing device, such as, for example, a media access control (MAC) address, an internet protocol (IP) address, and/or the like.

The network control entity 321 can update and/or revise its configuration table accordingly. The network control entity 321 can then send updated forwarding-state information 370 to the network control entity 322, as shown in FIG. 5. In some embodiments, such forwarding-state information 370 can include, for example, port identifiers of the ports 327, 328 associated with the network control entity 321, a port identifier associated with the updated status of port 327, a network segment identifier associated with a network segment with which the network control entity 321 is associated, peripheral processing device identifiers (e.g., MAC address, IP address, etc.) associated with the peripheral processing devices operatively coupled to the ports 327, 328, a peripheral processing device identifier associated with the updated peripheral processing device and/or the like.

In some embodiments, the network control entity 321 can send the forwarding-state information 370 to the network control entity 322 using a targeted higher level protocol (e.g., an application layer protocol) such as, for example, Boarder Gateway Protocol (BGP). In such embodiments, the network control entity 321 can use such a higher level protocol in conjunction with any suitable lower level protocol (e.g., a data link layer protocol), such as, for example, Ethernet and/or Fibre Channel, to send the forwarding-state information 370. While BGP can be implemented at the application layer, it can be used to send forwarding-state information used to populate a routing table (e.g., at the network control entity 322) associated with a network layer. Using a targeted protocol, such as BGP, the network control entity 321 can send the forwarding-state information 370 to specific network control entities (e.g., 322) while refraining from sending the forwarding-state information to other network control entities (e.g., 312).

In some embodiments, the network control entity 322 can store the forwarding-state information 370 received from the network control entity 321 in a memory associated with the network control entity 322. For example, the network control entity 322 can store the forwarding-state information 370 at the memory (e.g., memory 252 of FIG. 2) of the edge device 320 at which the network control entity 322 is located. Similarly stated, the network control entity 322 can update a configuration and/or forwarding-state table within the memory of the edge device 320 in response to receiving the forwarding-state information 370. In some embodiments, the forwarding-state information 370 can be stored at a portion of the memory of the edge device 320 allocated and/or partitioned for the network control entity 322.

The network control entity 322 can then send the updated forwarding-state information 370 to data plane modules (not shown) at the edge devices 320, 310 at which ports 315, 325, 326 associated with the network control entity 322 are located. In some embodiments, for example, the network control entity 322 can store the forwarding-state information 370 at a portion of the memory (e.g., within a routing table) of the edge device 320 allocated and/or partitioned for data, processes and/or applications associated with the data plane. In such embodiments, the memory of the edge device 320 can store the forwarding-state information 370 in a portion of the memory associated with the network control entity 322 as well as in a portion of the memory associated with the data plane module. In other embodiments, the forwarding-state information 370 is stored within a single location within the memory of the edge device 320 accessible by the applicable processes at the edge device 320 (including the network control entity 322 and the data plane module). The network control entity 322 also sends the forwarding-state information 370 to a data plane module at the edge device 310 (port 315 at edge device 310 is associated with the network control entity 322). Similar to the edge device 320, the edge device 310 can store the forwarding-state information within a memory (e.g., within a routing table). In such a manner, forwarding-state information can be distributed to the applicable data plane modules. Additionally, in such a manner, forwarding-state information can be updated at the network control entities 312, 321, 322, 332 each time the topology of the switch fabric system is updated.

In some embodiments, the network control entity 312 can be part of a different virtual switch fabric system (e.g., network segment) than the network control entities 321 and 322. In such embodiments, the network control entity 321 can send forwarding-state information 370 to the network control entities (e.g., 322) associated with the same virtual switch fabric system while refraining from sending the forwarding-state information to the network control entities (e.g., 312) outside of that virtual switch fabric system and/or associated with another virtual switch fabric system. In such a manner, multiple virtual switch fabric systems (e.g., network segments) can be defined within the switch fabric system 300. In other embodiments, the network control entity 321 also sends the updated forwarding-state information 370 to the network control entity 312. In such embodiments, the network control entity 312 can determine that the forwarding-state information 370 is associated with a different virtual switch fabric system and, accordingly, discard the forwarding-state information 370.

After the current forwarding-state information 370 has been distributed to the appropriate network control entities, a source peripheral processing device can send a data packet to a destination peripheral processing device (see, e.g., FIG. 1 and its related description). For example, a source peripheral processing device operatively coupled to the port 315 can send a data packet to a destination peripheral processing device operatively coupled to the port 327. Specifically, the source peripheral processing device operatively coupled to the port 315 can send the data packet to a data plane module of the edge device 310. The data plane module of the edge device 310 can parse the data packet to retrieve a destination identifier (e.g., an identifier of a peripheral processing device operatively coupled to the port 327). Using the destination identifier, the data plane module of the edge device 310 can query a lookup table having the forwarding-state information. The forwarding-state information can indicate to the data plane module of the edge device 310 that the destination peripheral processing device is operatively coupled to the edge device 320. In some embodiments, the data plane module of the edge device 310 can append a header having an identifier of the edge device 320. Additionally, the data plane module of the edge device 310 can further prepare (e.g., classify, partition the data packet into cells, etc.) and send the data packet to the edge device 320 via a switch fabric (e.g., switch fabric 102 of FIG. 1). A data plane module of the edge device 320 can receive the data packet and prepare and send the data packet to the peripheral processing device operatively coupled to the port 327.

Figure 6:
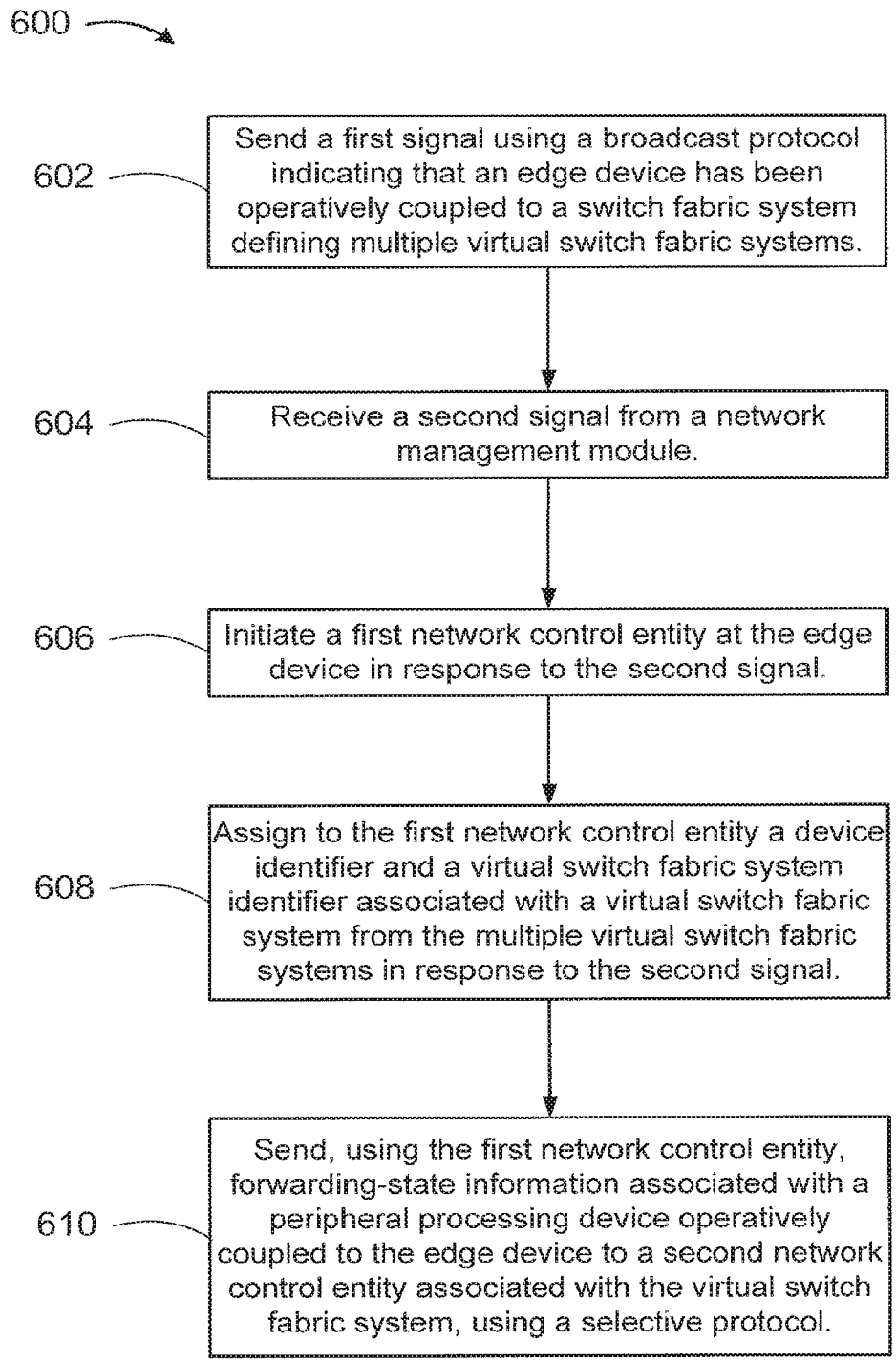
FIG. 6 is a flow chart illustrating a method of transmitting initiation signals and forwarding-state information between edge devices using a broadcast protocol and a selective protocol, respectively, according to another embodiment.

FIG. 6 is a flow chart illustrating a method 600 of transmitting initiation signals and forwarding-state information between edge devices using a broadcast protocol and a selective protocol, respectively, according to another embodiment. The method 600 includes sending a first signal using a broadcast protocol indicating that an edge device has been operatively coupled to a switch fabric system defining multiple virtual switch fabric systems, at 602. As discussed above, such a broadcast protocol can be similar to IS-IS, OSPF, and/or the like. In some embodiments, the first signal is sent to a fixed multicast address. Using a fixed multicast address allows a network management module having a dynamic address to receive the first signal.

A second signal is received from a network management module, at 604. A first network control entity is initiated at the edge device in response to the second signal, at 606. Additionally, the first network control entity is assigned a device identifier and a virtual switch fabric system identifier associated with a virtual switch fabric system from the multiple virtual switch fabric systems in response to the second signal, at 608. The first network control entity manages at least a portion of the edge device. In some embodiments, for example, the first network control entity manages forwarding-state information associated with at least one port at the edge device. In such embodiments, the at least one port and a peripheral processing device coupled to the at least one port can be said to be associated with the first network control entity.

Forwarding-state information associated with a peripheral processing device operatively coupled to the edge device is sent, using the first network control entity, to a second network control entity associated with the virtual switch fabric system using a selective protocol, at 610. The selective protocol can be used such that the forwarding-state information is sent to the network control entities associated with the virtual switch fabric system but not network control entities associated with other virtual switch fabric systems. Accordingly, the forwarding-state information is sent to the network control entities associated with the same virtual switch fabric system. As discussed above, in some embodiments, the selective protocol can be the Boarder Gateway Protocol (BGP). As such, the first network control entity and the second network control entity can be said to be BGP speakers.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Embodiments shown and described above refer to multiple peripheral processing devices, including compute notes, storage nodes, service nodes and routers. In some embodiments, one or more of the compute nodes can be general-purpose computational engines that can include, for example, processors, memory, and/or one or more network interface devices (e.g., a network interface card (NIC)). In some embodiments, the processors within a compute node can be part of one or more cache coherent domains. In some embodiments, the compute nodes can be host devices, servers, and/or so forth. In some embodiments, one or more of the compute nodes can have virtualized resources such that any compute node (or a portion thereof) can be substituted for any other compute node (or a portion thereof) operatively coupled to a switch fabric system.

In some embodiments, one or more of the storage nodes can be devices that include, for example, processors, memory, locally-attached disk storage, and/or one or more network interface devices. In some embodiments, the storage nodes can have specialized modules (e.g., hardware modules and/or software modules) configured to enable, for example, one or more of the compute nodes to read data from and/or write data to one or more of the storage nodes via a switch fabric. In some embodiments, one or more of the storage nodes can have virtualized resources so that any storage node (or a portion thereof) can be substituted for any other storage node (or a portion thereof) operatively coupled to a switch fabric system.

In some embodiments, one or more of the services nodes can be an open systems interconnection (OSI) layer-4 through layer-7 device that can include, for example, processors (e.g., network processors), memory, and/or one or more network interface devices (e.g., 10 Gb Ethernet devices). In some embodiments, the services nodes can include hardware and/or software configured to perform computations on relatively heavy network workloads. In some embodiments, the services nodes can be configured to perform computations on a per packet basis in a relatively efficient fashion (e.g., more efficiently than can be performed at, for example, a compute node). The computations can include, for example, stateful firewall computations, intrusion detection and prevention (IDP) computations, extensible markup language (XML) acceleration computations, transmission control protocol (TCP) termination computations, and/or application-level load-balancing computations. In some embodiments, one or more of the services nodes can have virtualized resources so that any service node (or a portion thereof) can be substituted for any other service node (or a portion thereof) operatively coupled to a switch fabric system.

In some embodiments, one or more of the routers can be networking devices configured to connect at least a portion of a switch fabric system (e.g., a data center) to another network (e.g., the global Internet). In some embodiments, for example, a router can enable communication between components (e.g., peripheral processing devices, portions of the switch fabric) associated with a switch fabric system. The communication can be defined based on, for example, a layer-3 routing protocol. In some embodiments, one or more of the routers can have one or more network interface devices (e.g., 10 Gb Ethernet devices) through which the routers can send signals to and/or receive signals from, for example, a switch fabric and/or other peripheral processing devices.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components, and/or features of the different embodiments described.

What is claimed is:

1. An apparatus, comprising:
a management server operatively coupled to a plurality of edge devices, the management server configured to receive a signal from an edge device from the plurality of edge devices, in response to that edge device broadcasting the signal to the management server and to the plurality of edge devices, and such that the plurality of edge devices store information contained in the signal, the management server configured to provision that edge device in response to receiving the signal,
the management server configured to define a plurality of network control entities at the plurality of edge devices such that each network control entity from the plurality of network control entities provides forwarding-state information to at least one remaining network control entity from the plurality of network control entities.

2. The apparatus of claim 1, wherein:
the forwarding-state information is provided to the at least one remaining network control entity from the plurality of network control entities using a selective protocol substantially similar to the Border Gateway Protocol (BGP).

3. The apparatus of claim 1, wherein each network control entity from the plurality of network control entities is associated with a virtual switch fabric system from a plurality of virtual switch fabric systems and is configured to provide forwarding-state information to at least one remaining network control entity from the plurality of network control entities, the forwarding-state information being associated with the at least one peripheral processing device from a plurality of peripheral processing devices operatively coupled to the plurality of edge devices.

4. The apparatus of claim 1, wherein the management server is further configured to assign a unique device identifier to the edge device from the plurality of edge devices in response to receiving the signal from the edge device.

5. The apparatus of claim 1, wherein each edge device from the plurality of edge devices is operatively coupled to the remaining edge devices from the plurality of edge devices via the switch fabric, the switch fabric defines a single logical hop between edge device pairs from the plurality of edge devices.

6. The apparatus of claim 1, wherein a first edge device from the plurality of edge devices is configured to send data to a peripheral processing device from a plurality of peripheral processing devices operatively coupled to a second edge device from the plurality of edge devices using forwarding-state information received at the first edge device from a network control entity from the plurality of network control entities and that is associated with the peripheral processing device.

7. A system, comprising:
an edge device to be operatively coupled to a switch fabric, the edge device to send a broadcast signal to a plurality of devices associated with the switch fabric, the plurality of devices including a plurality of edge devices to store information contained in the broadcast signal; and
a management server to be operatively coupled to the plurality of edge devices, the management server to automatically send a provisioning signal to the edge device and the plurality of edge devices in response to the management server receiving the broadcast signal,
the management server defining a first network control entity at the edge device and a second network control entity at an edge device from the plurality of edge devices, the first network control entity being associated with a first set of peripheral processing devices from a plurality of peripheral processing devices, the second network control entity being associated with a second set of peripheral processing devices from the plurality of peripheral processing devices, the first network control entity to send forwarding-state information associated with the first set of peripheral processing devices to the second network control entity.

8. The system of claim 7, wherein:
the edge device to be operatively coupled to the switch fabric is a first edge device, the edge device from the plurality of edge devices that is associated with the second network control entity is a second edge device,
the first network control entity and the second network control entity are associated with a first virtual switch fabric system, the management server defining a third network control entity at a third edge device from the plurality of edge devices, the third network control entity being associated with a second virtual switch fabric system, the management server configured to restrict the first network control entity from sending forwarding-state information associated with the first set of peripheral processing devices to the third network control entity.

9. The system of claim 7, wherein the edge device to be operatively coupled to the switch fabric is configured to send data to each edge device from the plurality of edge devices via the switch fabric, the switch fabric defines a single logical hop between edge device pairs from the plurality of edge devices.

10. The system of claim 7, wherein the management server is to assign a unique device identifier to the edge device to be operatively coupled to the switch fabric, in response to receiving the signal from the edge device to be operatively coupled to the switch fabric.

11. An apparatus, comprising:
a first edge device of a switch fabric, the first edge device configured to receive an initiation signal from a second edge device broadcasting the initiation signal via a multicast address in response to the second edge device operatively coupling to the switch fabric, the initiation signal including provisioning information, the first edge device configured to store the provisioning information,
the first edge device configured to receive, via the multicast address, a provisioning signal that includes at least one identifier of a network control entity to be initiated at the second edge device, the first edge device configured to store the at least one identifier of the network control entity.

12. The apparatus of claim 11, wherein the first edge device is operatively coupled to a plurality of peripheral processing devices, the first edge device is configured to send forwarding state information associated with at least one peripheral processing device from the plurality of peripheral processing devices to the network control entity using the at least one identifier of the network control entity.

13. The apparatus of claim 11, wherein the first edge device is operatively coupled to a plurality of peripheral processing devices, the first edge device is configured to send forwarding state information associated with at least one peripheral processing device from the plurality of peripheral processing devices to the network control entity using a selective protocol substantially similar to the Border Gateway Protocol (BGP).

* * * * *